United States Patent [19]
Shimano et al.

[11] Patent Number: 6,145,213
[45] Date of Patent: Nov. 14, 2000

[54] POSITION DETECTION APPARATUS

[75] Inventors: Tadahiko Shimano; Jun Iijima, both of Kanagawa, Japan

[73] Assignee: Sony Precision Technology Inc., Tokyo, Japan

[21] Appl. No.: 09/274,365

[22] Filed: Mar. 23, 1999

[30] Foreign Application Priority Data

Mar. 31, 1998 [JP] Japan .................................. 10-087439

[51] Int. Cl.$^7$ ....................................................... G01B 7/04
[52] U.S. Cl. ............................................... 33/702; 33/706
[58] Field of Search ............................. 33/702, 703, 706, 33/707, 708

[56] References Cited

U.S. PATENT DOCUMENTS

| | | | |
|---|---|---|---|
| 4,198,757 | 4/1980 | Nelle et al. | 33/706 |
| 4,530,157 | 7/1985 | Nelle et al. | 33/707 |
| 4,569,137 | 2/1986 | Ichikawa | 33/706 |
| 4,570,346 | 2/1986 | Burkhardt | 33/706 |
| 4,663,853 | 5/1987 | Indo et al. | 33/707 |
| 4,991,311 | 2/1991 | Nagaoka et al. | 33/702 |
| 5,375,338 | 12/1994 | Nelle | 33/702 |
| 5,611,148 | 3/1997 | Affa | 33/702 |
| 6,002,126 | 12/1999 | Feichtinger | 33/707 |

FOREIGN PATENT DOCUMENTS 2403480  4/1979  France.

*Primary Examiner*—G. Bradley Bennett
*Attorney, Agent, or Firm*—Jay H. Maioli

[57] ABSTRACT

The present invention provides a position detection apparatus capable of reducing the bending moment in the longitudinal direction of a recording medium and being fixed to a machine tool without deforming the main body or the recording medium, thus enabling to obtain a high detection accuracy. The position detection apparatus detects a relative movement position between the reference block 4 and the movable block which move relative to each other along straight line. A round bar-shaped recording medium 12 is provided inside a frame 11 of a main body 2. The frame 11 is fixed to the reference block 4 with a fixing member 55 having an abutment surface for the frame 11 which abutment surface has a curvature only in a direction parallel to the longitudinal direction of the recording medium.

2 Claims, 9 Drawing Sheets

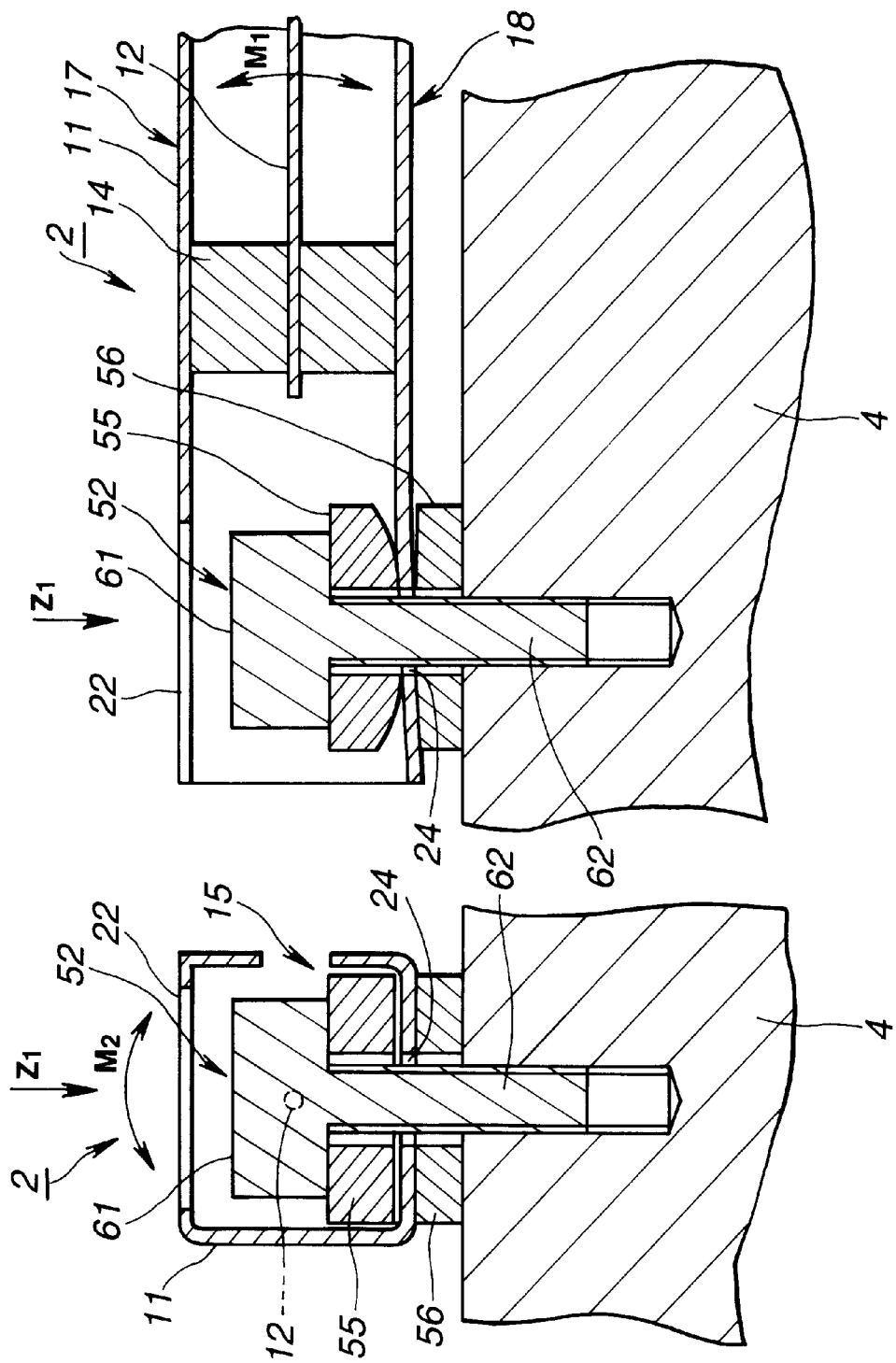

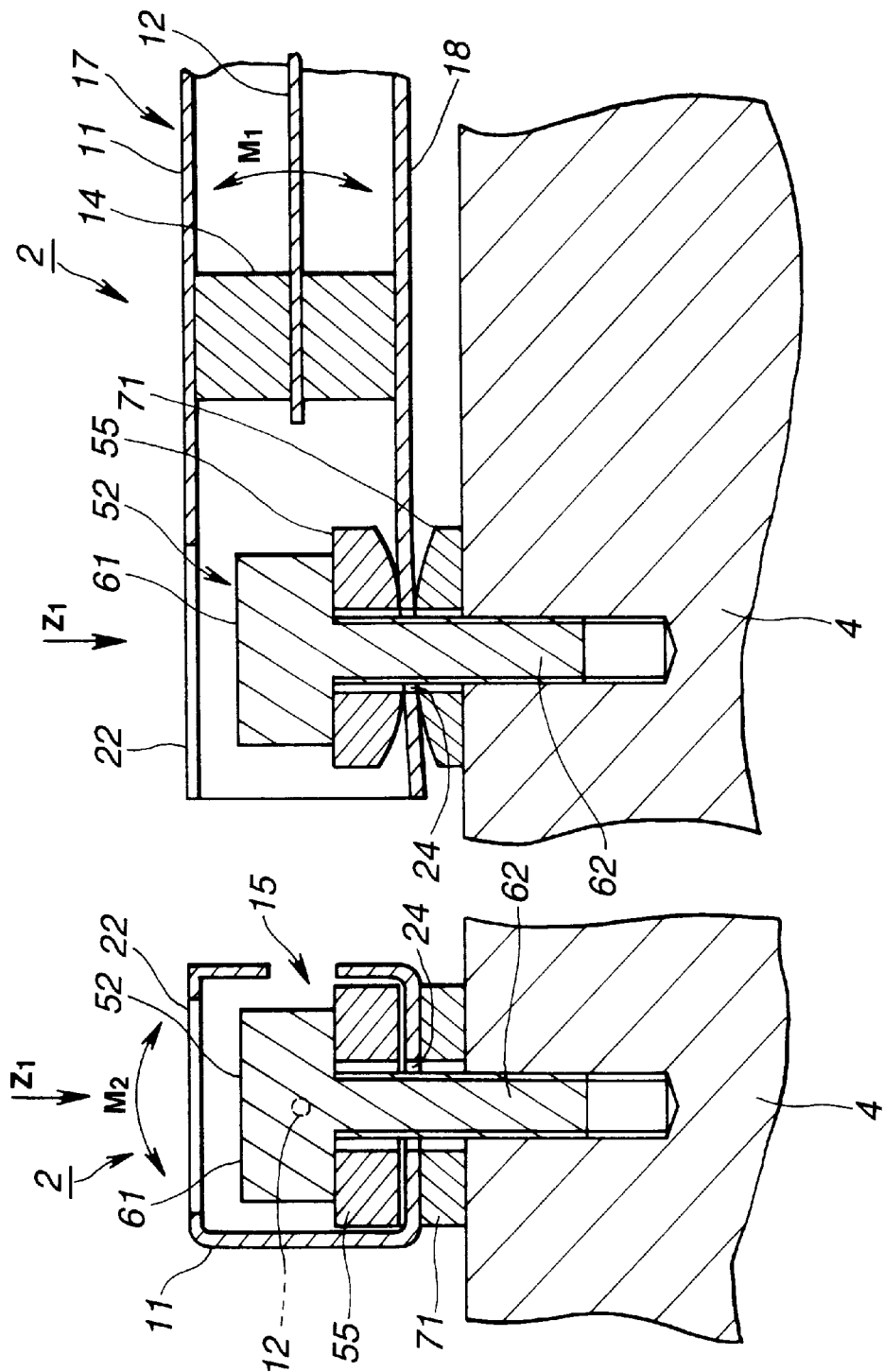

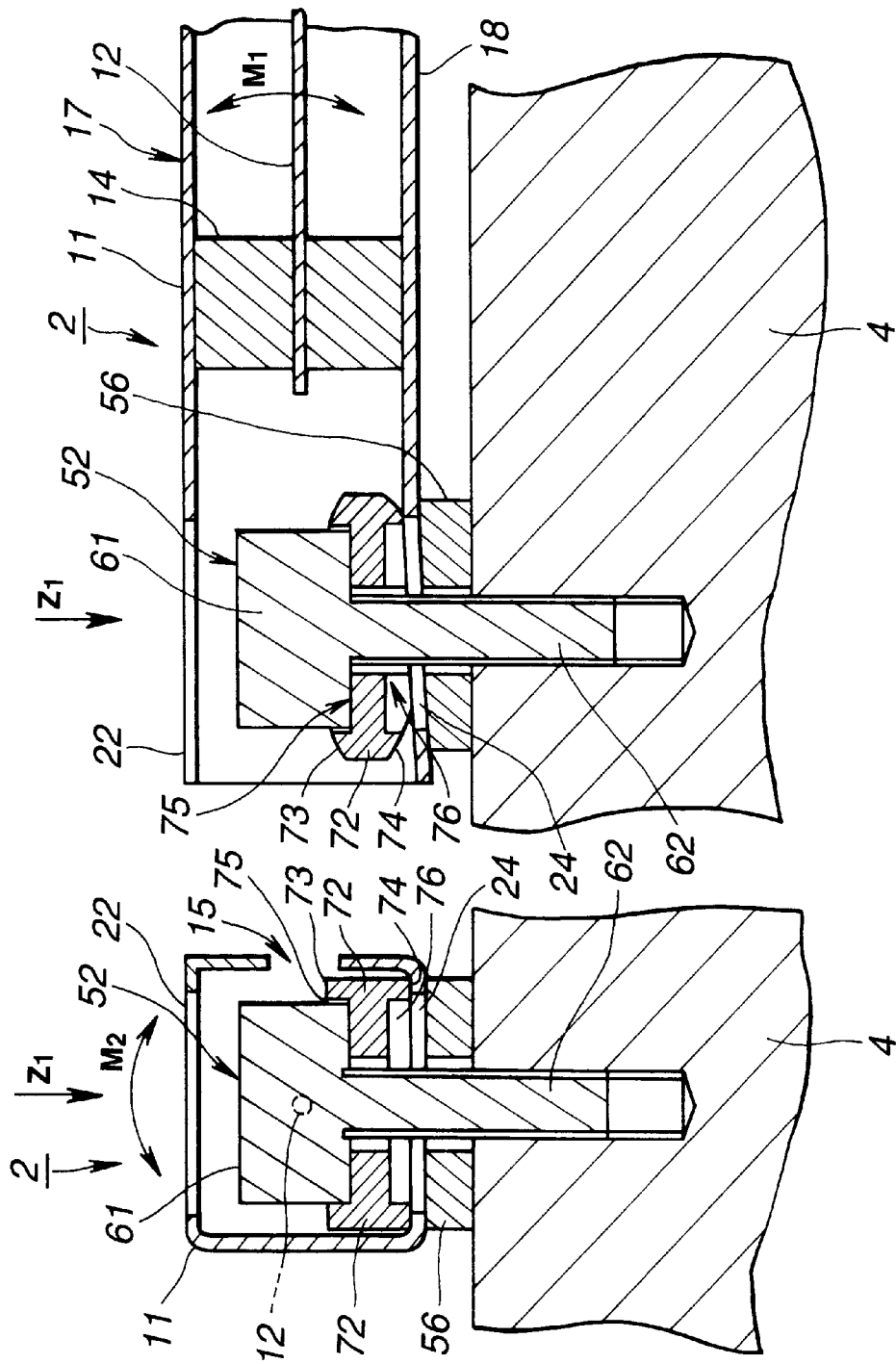

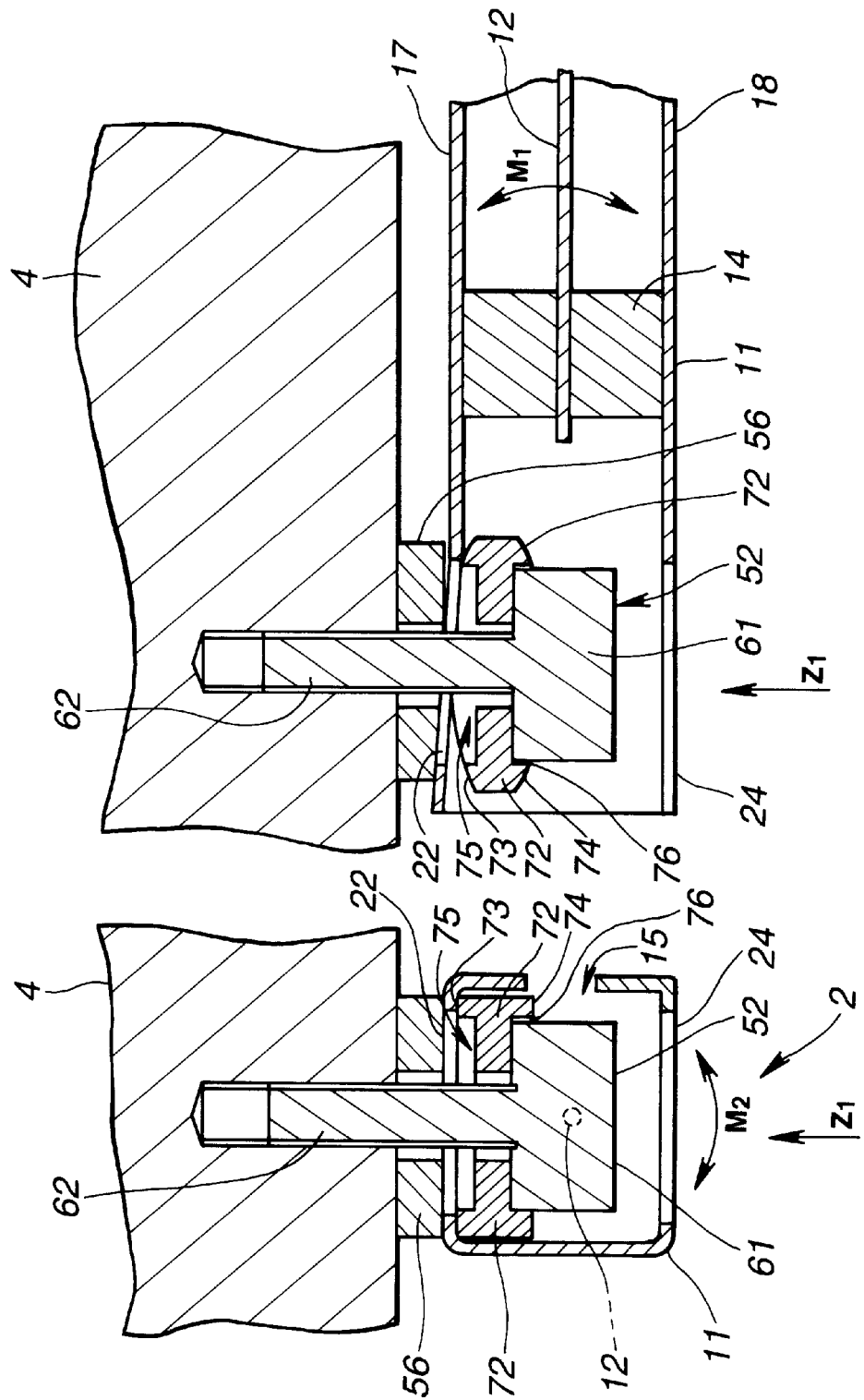

POSITION DETECTION APPARATUS

BACKGROUND OF THE INVENTION

1. Field of the Invention

The present invention relates to a position detection apparatus for use in controlling position of a movable portion of a machine tool or industrial apparatus and in particular, to a position detection apparatus for detecting a position of a movable portion performing a linear movement.

2. Description of the Prior Art

Conventionally, a position detection apparatus such as a scale apparatus has been used for performing a position control of a movable portion which performs a linear motion.

The scale apparatus generally includes a main body and a head slider provided in the main body in such a manner that the head slider can move in a linear motion.

In the main body, there is provided, a recording medium shaped, for example, in a round bar, and called "scale". On this scale, a position signal is recorded along the longitudinal direction of the scale. In the position signal, pits and marks are repeated a predetermined number of times. For example, the position signal is a magnetic signal in which the polarity is reversed with a predetermined recording wavelength. Moreover, the head slider has a detection head for detecting the position signal recorded on the scale. This detection head is, for example, provided at a position facing to this position signal and moves in the longitudinal direction of the scale together with the linear movement of the head slider.

In such a scale apparatus constituted by the main body and the head slider is mounted on a reference block and a movable block of a machine tool performing a relative linear movement. That is, the main body or the head slider is fixed on the reference block, and the other is fixed on the movable block. Here, the main body is mounted in such a manner that the longitudinal direction of the scale is in parallel to the movement of the movable block. Accordingly, in this scale apparatus, as the movable block moves in a linear motion, the relative position between this main block and the head slider is changed.

In this scale apparatus having the aforementioned configuration, the detection head provided in the slider head detects the position signal changing according to the change of the relative position, so as to control the position (shift amount) of the movable position.

The main body of the scale apparatus having a long scale for detecting a linear movement position of a machine tool or the like is generally mounted on a machine tool using bolts.

FIG. 1 is a cross sectional view of a main body of a conventional scale apparatus mounted on a reference block of a machine tool. Fig. 1A is a cross sectional view of the main body as viewed about a line vertically intersecting the longitudinal direction of a scale provided in the main body. Fig. 1B is a cross sectional view of the main body as viewed about a line parallel to the longitudinal direction of the scale provided in the main body.

The main body 100 of the scale apparatus has a frame 101 and a bar-shaped scale 102 which are fixed by a bracket 103. Moreover, the frame 101 is fixed to a reference block 110 of a machine tool using fixing members such as a bolt 104, a first washer 105, and a second washer 106.

In the frame 101, the first washer 105 is arranged in such a manner that the center of the insert hole for inserting the bolt shaft is matched with the center of the frame mounting hole 107 provided in the frame 101. Moreover, between the frame 101 and the reference block 110, the second washer 106 is arranged in such a manner that the center of the bolt insert hole is matched with the center of the frame mounting hole 107. The bolt 104 has a bolt head 108 contained inside the frame 101 and a bolt 108 extending through insert hole of the first washer 105, the frame mounting hole 107, and the insert hole of the second washer 106, protruding out of the frame 101. A tightening force is given to the bolt 104 in the direction ($Z_2$ in FIG. 1) from the bolt head 108 toward the bolt shaft 109, so that the frame 101 is fixed to the reference block 110.

The main body 100 fixed by such fixing members is normally is fixed at both ends of the longitudinal direction of the frame 101, considering the reduction in the size of the fixing members and mounting convenience.

Here, the abutment face between the bolt head 108 and the first washer 105, the abutment face between the first washer 105 and the frame 101, the abutment face between the frame 101 and the second washer 106, and the abutment face between the second washer 106 and the reference block 110 are usually not a completely flat plane but there exists fine warps, curves, and bending. Moreover, in general, the bolt shaft 109 is not completely vertical to the bolt head 108 but there exists a fine inclination. Furthermore, because it is difficult to tighten the bolt shaft 109 completely vertical to the longitudinal direction of the scale 102 and accordingly, it is difficult to fix the bolt shaft 109 completely vertical to the longitudinal direction of the scale 102.

For this, in the conventional scale apparatus, in order to increase the fixing force for fixing the main body 100 to the reference block 110, for example, it is not uncommon to increase the diameters of the fixing members including the bolt head 108, the first washer 105, and the second washer 106, and increase the tightening force from the bolt head 108 to the bolt shaft 109. However, in this case, a bending moment $M_3$ in the longitudinal direction of the scale 102 is applied to the frame 101, resulting in a deformation of the frame 101 and the scale 102, for example, in a bow shape.

Thus, in the conventional scale apparatus, it is difficult to mount the longitudinal direction of the scale 102 in parallel to the movement direction of the movable portion of the machine tool. This often deteriorates the accuracy of the position detection.

SUMMARY OF THE INVENTION

It is therefore an object of the present invention to provide position detection apparatus that can be fixed to a machine tool or the like without deforming the main body or recording medium while reducing the bending moment against the longitudinal direction of the recording medium, thus enabling to obtain a highly accurate position detection.

The position detection apparatus according to the present invention is for detecting a relative movement position of a first member and a second member which move along a straight line relative to each other, the apparatus comprising: a main body fixed to the first member and holding a prolonged recording medium having a position signal recorded in its longitudinal direction which is parallel to a relative movement direction of the first member and the second member; a head slider fixed to the second member, having a detection head for detecting the position signal, and arranged on the main body so as to be movable in a direction parallel to the longitudinal direction of the recording medium; and a fixing member for fixing the main body to the first member and having an abutment surface for abutment with the main body, which abutment surface has a curvature only in a direction parallel to the longitudinal direction of the recording medium.

In the position detection apparatus, the fixing member having an abutment surface for the main body, having a curvature only in a direction parallel to the recording medium fixes the main body to the first member so as to be parallel to the longitudinal direction of the recording medium, so that the detection head detects the position signal recorded on the recording medium, thus detecting a relative movement between the first member and the second member.

According to another aspect of the present invention, the position detection apparatus is for detecting a relative movement position of a first member and a second member which move along a straight line relative to each other, the apparatus comprising: a prolonged recording medium having a position signal recorded in its longitudinal direction and fixed to the first member in such a manner that the longitudinal direction is parallel to a relative movement direction of the first member and the second member; a detection head fixed to the second member so as to move in a direction parallel to the longitudinal direction of the recording medium relative to the first member for detecting the position signal; and a fixing member for fixing the recording medium to the first member and having an abutment surface for abutment with the recording medium which abutment surface has a curvature only in a direction parallel to the longitudinal direction of the recording medium.

In the position detection apparatus, the fixing member having an abutment surface for the main body, having a curvature only in a direction parallel to the recording medium fixes the recording medium to the first member, so that the detection head detects the position signal recorded on the recording medium, thus detecting a relative movement between the first member and the second member.

BRIEF DESCRIPTION OF THE DRAWINGS

FIGS. 6A and 6B are cross sectional views of the main body of the scale apparatus for explaining fixing members for fixing the main body to the reference block.

FIGS. 7A and 7B are cross sectional views of the main body of the scale apparatus for explaining a modification of the fixing members.

FIGS. 8A and 8B are cross sectional views of the main body of the scale apparatus for explaining another modification of the fixing members.

FIGS. 9A and 9B are cross sectional views of the main body of the scale apparatus for explaining still another modification of the fixing members.

DETAILED DESCRIPTION OF PREFERRED EMBODIMENTS

Hereinafter, description will be directed to a scale apparatus according to an embodiment of the present invention with reference to the attached drawings.

Figures 1A, 1B:
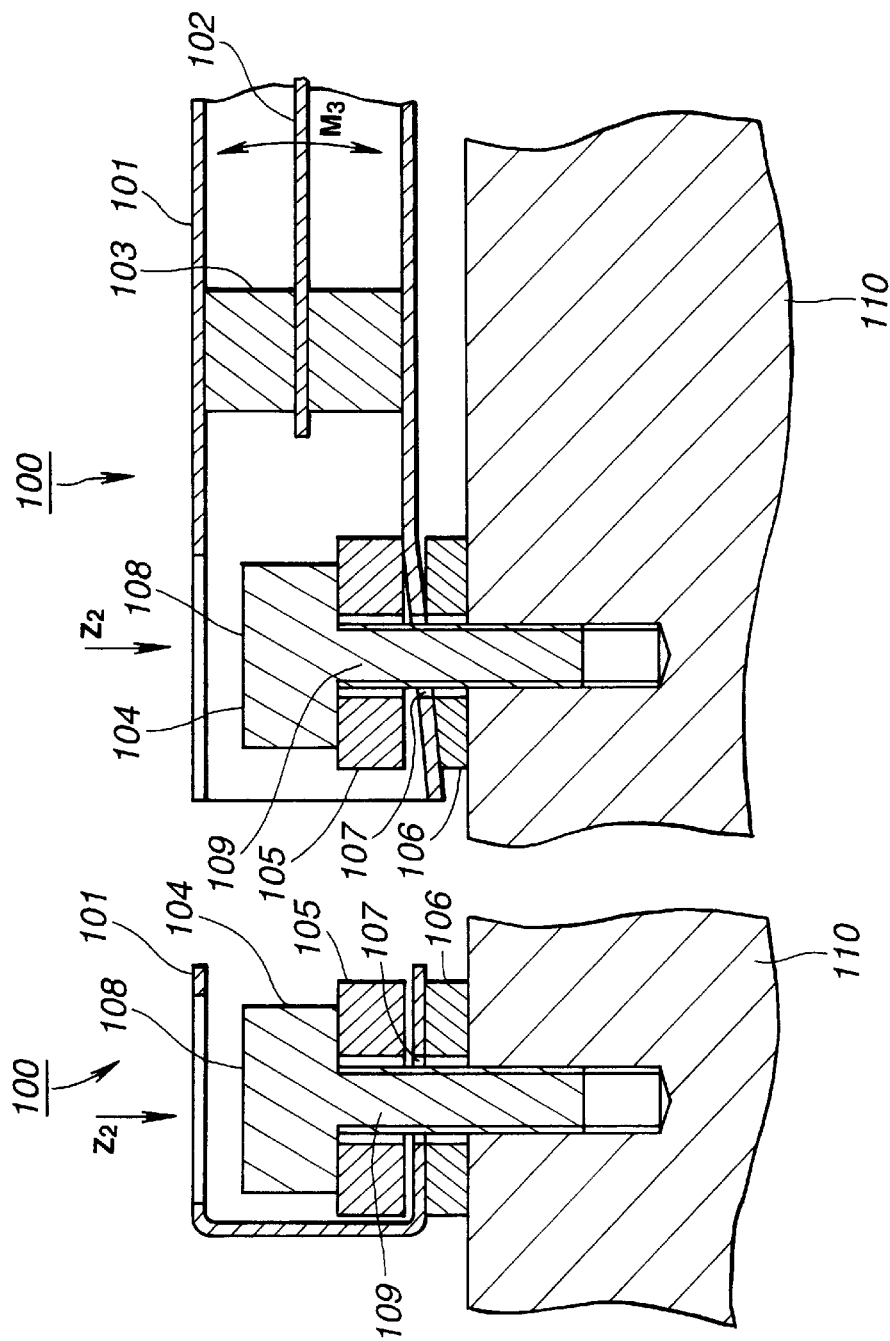
FIGS. 1A and 1B are cross sectional views of a main body of a conventional scale apparatus for explanation of fixing members for fixing the main body to a reference block.
Figure 2:
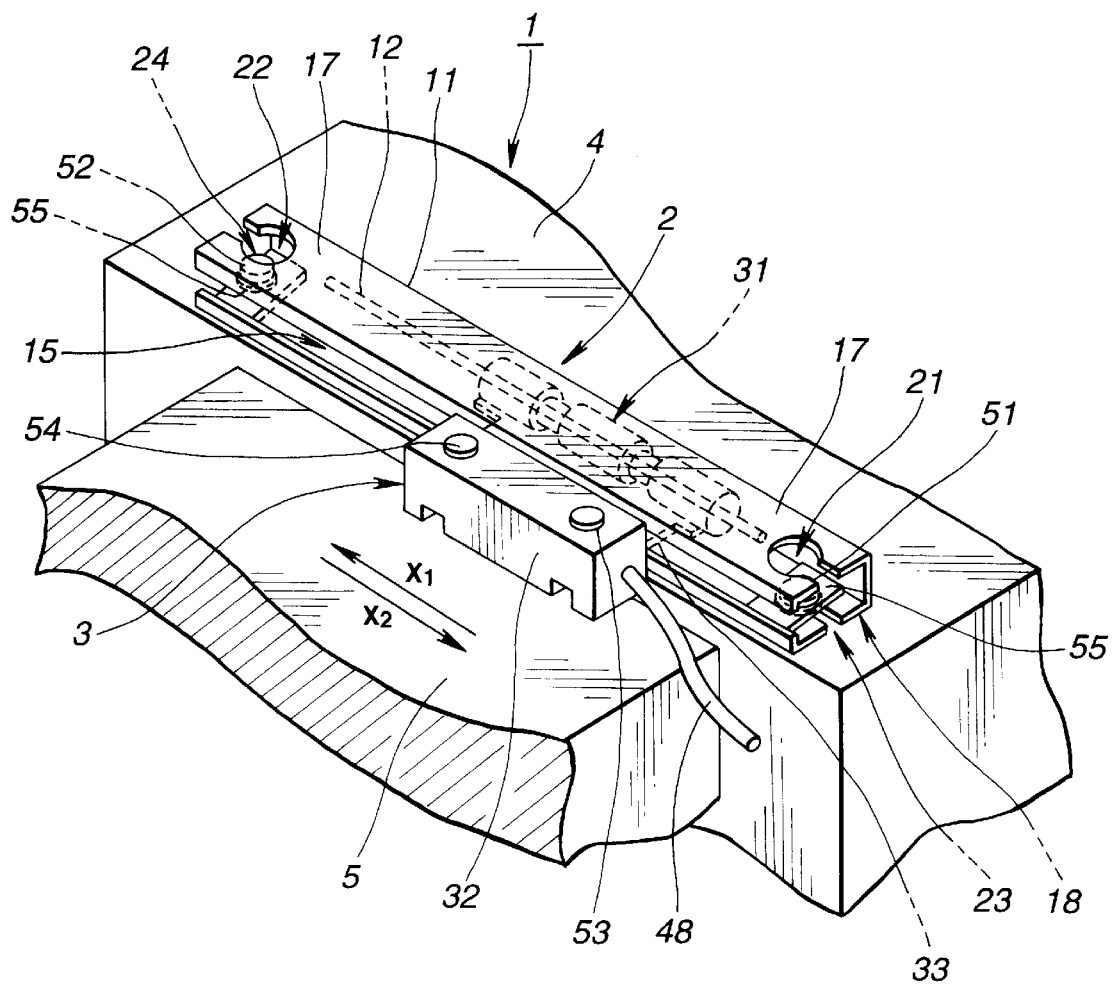
FIG. 2 is a perspective view of a scale apparatus according to an embodiment of the present invention.
Figure 3:
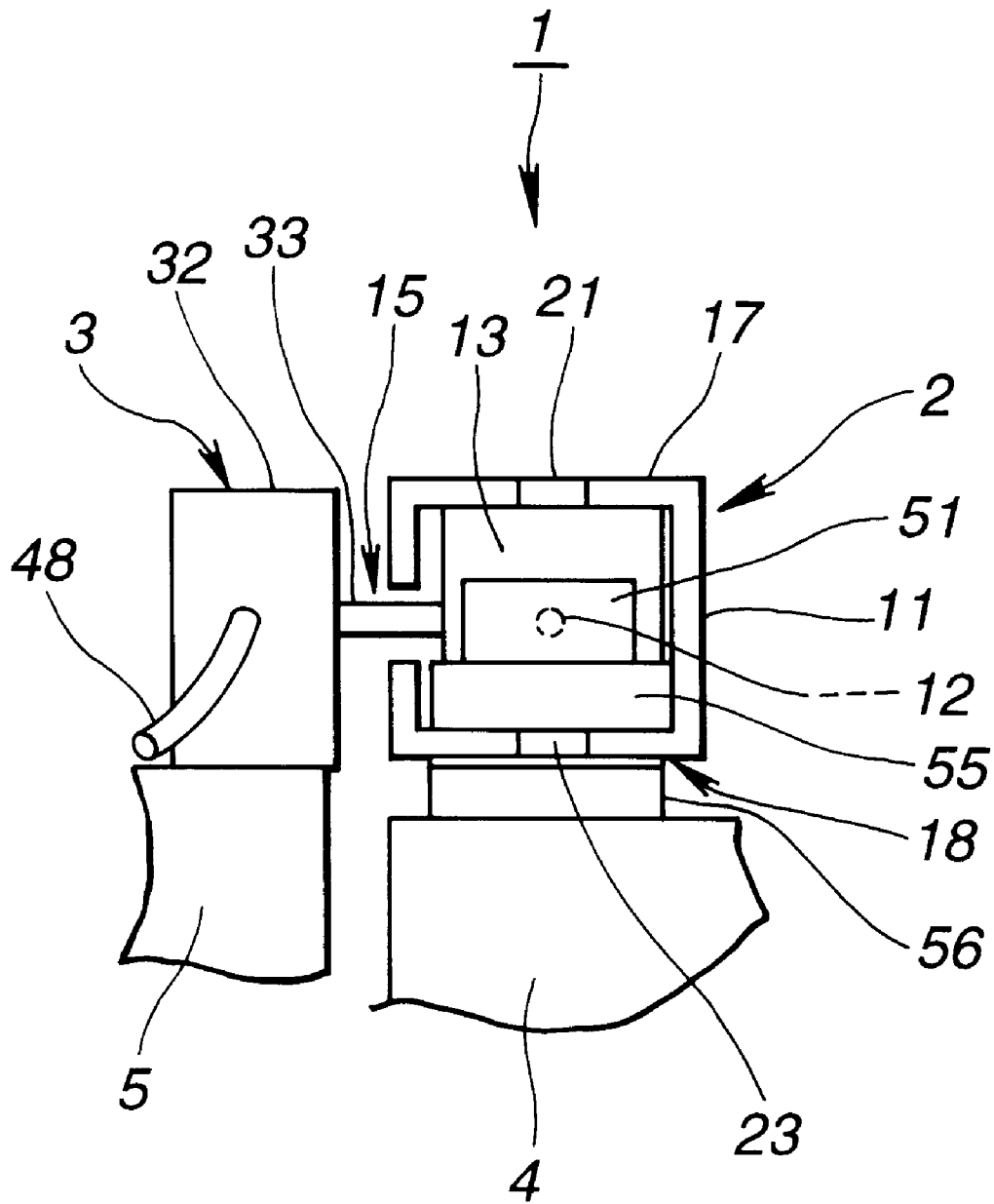
FIG. 3 is a side view of the scale apparatus.
Figure 4:
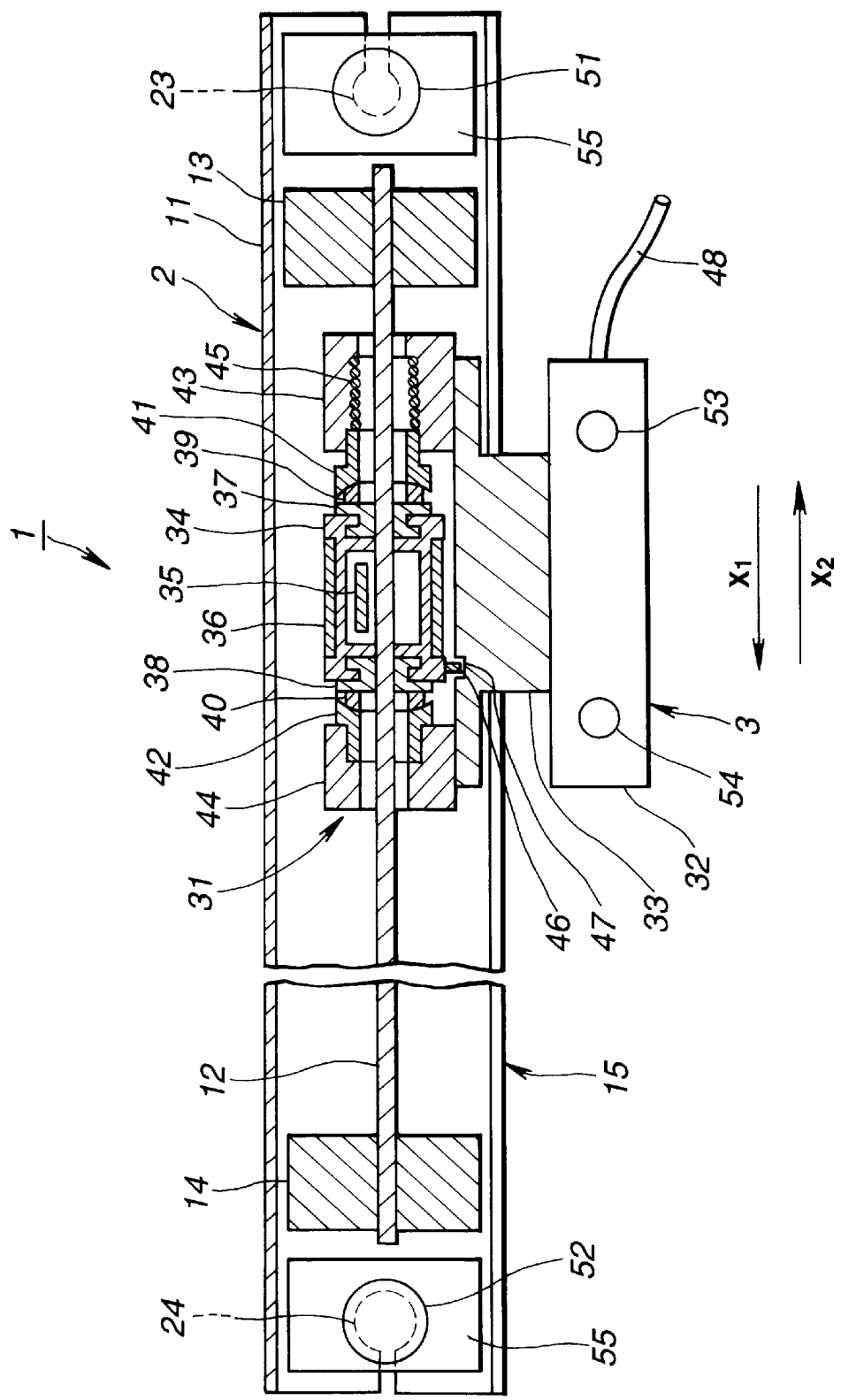
FIG. 4 is a cross sectional view of the scale apparatus showing an internal configuration of the scale apparatus.

FIG. 2 is a perspective view of the scale apparatus according to the embodiment of the present invention. FIG. 3 is a side view of this scale apparatus. FIG. 4 is cross sectional view of this scale apparatus, showing in internal configuration of the scale apparatus.

The scale apparatus 1 according to the embodiment of the present invention includes: a main body 2 and a head slider 3 mounted on this main body.

The scale apparatus 1 is used to detect a relative positions of two members constituting a machine tool and moving along a straight line relatively to each other. For example, the scale apparatus 1 detects a reference block 4 provided at a predetermined fixed position and a position of a movable block 5 moving in the direction of $X_1$ and $X_2$ with respect to this reference block 4. In this scale apparatus 1, one the main body 2 and the head slider 3 is mounted on the reference block 4 and the other is mounted on the movable block 5. FIG. 2 and FIG. 3 shows an example in which the main body 2 is mounted on the reference block 4 and the head slider 3 is mounted on the movable block 5.

The main body 2 is a recording medium consisting of a frame 11 and a round bar-shaped recording medium made from a material having a high coercive force. In side the frame 11, there is provided a scale 12 whose two ends are held by brackets 13, 14, so that the two ends are fixed at predetermined positions in the frame II. It should be noted that for simplification of the drawing, FIG. 2 does not depict the brackets 13 and 14.

The frame 11 has, for example, a hollow parallelepiped having one side with a slit 15 formed. Moreover, the frame 11 has frame mounting holes of approximately circular shape 21, 22, 23, 24 at the ends in the longitudinal direction of the side faces 17, 18 vertically intersecting the side faces having the slit 15.

The scale 12 is held through the brackets 13, 14 and fixed inside the frame 11. The scale 12 is arranged in parallel to the longitudinal direction of the frame 11 and on the center axis of the parallelepiped. Moreover, a position signal having pits and marks repeated at a predetermined interval is recorded in the longitudinal direction of the scale 12. For example, a magnetic signal in which polarity is reversed with a predetermined recording wavelength is successively recorded as a position signal in the longitudinal direction of the scale.

Moreover, the head slider 3 includes: a head holder block 31 provided inside the main body; a head carrier 32 provided outside the main body 2; and a linkage block 33 for linking the head holding block 31 to the head carrier 32. The head slider 3 is mounted in such a manner that the head slider 3 can move in the longitudinal direction of the scale 12.

Figure 5:
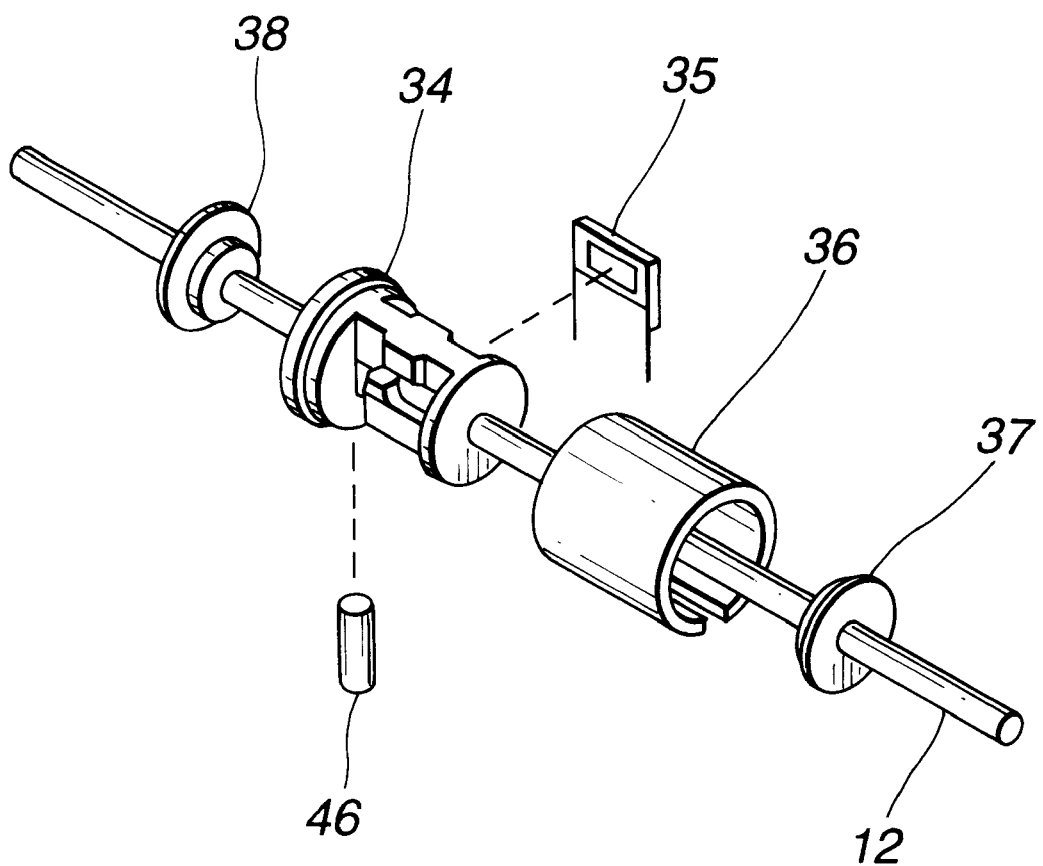
FIG. 5 is an exploded perspective view of an essential portion of a head holder of the scale apparatus.

FIG. 5 is an exploded perspective view of the essential portion of this head holder 31.

The head holding block 31 has a head holder 34. This head holder 34 has an insert hole for the scale 12. The scale 12 in inserted into this insert hole so that the head holder 34 is mounted on the scale 12 in such a manner that the head holder 34 can move in the longitudinal direction of the scale 12.

The head holder 34 is covered by a head holder case 36 and has an MR head 35 inside the head holder case 36. The MR head 35 detects the position signal recorded on the scale 12. The MR head 35 is provided at a position to face this position signal so as to detect the position signal recorded on the scale. This MR head 35 is held by the head holder 34 and moved together with the head holder 34 in the longitudinal direction of the scale 12.

At the two ends of head holder 34, there is provided a pair of slide support member 37, 38 in the longitudinal direction of the scale 12. Each of the slide support members 37, 38 has an approximately cylindrical form having an insert hole for inserting the scale 12. When the scale is inserted in the insert holes, the scale support member 37, 38 are slidably supported on this scale 12. Moreover, when the head holder 34 is moved in the longitudinal direction of the scale 12, the slide support member 37, 38 prevent the head holder 34 from moving in a direction vertically intersecting the sliding direction.

Moreover, the head holding block 31 has a pair of first spacers 39, 40 and a pair of second spacers 41, 42.

The pair of first spacers 39, 40 has an insert hole for inserting the scale 12. When the scale 12 is inserted through the holes, the pair of first spacers 39 and 40 are moved on the scale 12 in such a way that they can move in the longitudinal direction of the scale 12. Moreover, the pair of first spacers 39, 40 is in abutment with one end face of the slide support members 37, 38.

Moreover, each of the second spacers 4 1, 42 has a hole for inserting the scale 12. When the scale 12 is inserted in the holes, the spacers 41, 42 are mounted on the scale 12 in such a manner that the spacers 41, 42 can move in the longitudinal direction of the scale 12. Moreover, the spacers 41, 42 are in abutment with one end face of the first spacers 39, 40 not in abutment with the slide support members 37, 38.

Moreover, the head holding block 31 has a pair of head holder sandwiching members 43, 44 and a spring 45.

Each of the head holder sandwiching members 43, 44 has an insert hole for inserting the scale 12. When the scale 12 is inserted into the holes, the head holder sandwiching members 43, 44 are mounted on the scale 12 in such a manner that the sandwiching members 43, 44 can move in the longitudinal direction of the scale 12. Moreover, the head holder sandwiching members 43, 44 are fixed to the linkage block 33. This pair of sandwiching members 43, 44 sandwiches the head holder 34 having the slide support members 37, 38, via the first spacers 39, 40 and the second spacers 41, 42 in the longitudinal direction of the scale 12. Moreover, the spring 45 is arranged between the head holder sandwiching member 43 and the spacer 41. This spring 45 urges the head holder 34 in the direction from the head holder sandwiching member 43 to the head holder sandwiching member 44.

Moreover, a rotation preventing pin 46 is provided in the head holder 34. This rotation preventing pin 46 has one end fixed to the head holder 34 and the other end inserted into a rotation regulating hole 47 provided in the linkage block 33. This regulates the rotation of the head holder 34 around the scale 12.

Moreover, the first spacers 39, 40 and the second spacers 41, 42 are in abutment with a spherical abutment surface. When the head holder sandwiching members 43, 44 are displaced in a direction vertically intersecting the scale 12, the spherical abutment surfaces function to reduce the bending moment applied from the slide support members 37, 38 to the scale 12.

As has been described above, the head holding block 31 is mounted on the scale 12 in such a manner that the head holding block 31 can move in the longitudinal direction of the scale 12. According to this movement, the MR head 35 detects a position signal recorded on this scale 12.

This head holding block 31 is linked to the head carrier 32 via the linkage block 33. This linkage block 33 has one end fixed to the head holder sandwiching members 43, 44 and the other end extruding from the slit 15 so as to be fixed by the head carrier 32 provided outside the main body 2.

Thus, the head slider 3 is constituted by the head holding block 31, the head carrier 32, and the linkage block 33, and mounted on the main body 2 in such a manner that the head slider 3 can move in the longitudinal direction of the scale 12. The position signal detected by the MR head 35 according to the relative movement with respect to the main body 2 is supplied via a signal cable 48 provided in the head carrier 32 to a control apparatus (not depicted).

In the scale apparatus 1 having the aforementioned configuration, the scale 12 is parallel to the relative movement between the reference block 4 and the movable block 5 and the slit 15 opens at the side of the movable block 5. In the scale apparatus 1 thus arranged, the main body 2 is mounted using as the mounting surface one of the side faces not having the slit 15. The main body 2 is fixed to the reference block 4 with fixing members such as main body bolts 51, 52 at the position of the frame mounting holes 21, 22, 23, 24 provided at the ends of the frame in the longitudinal direction of the scale 12. Moreover, the head slider 3 of the scale apparatus 1 is fixed to the movable block 5 with slider bolts 53, 54.

Next, explanation will be given on the fixing members for fixing the main body 2 to the reference block 4.

FIG. 6 is a cross sectional view of the fixing members fixing the main body 2 to the reference block 4. FIG. 6A is a cross sectional view of the scale apparatus 1 in the direction vertically intersecting the longitudinal direction of the scale 12. FIG. 6B is a cross sectional view of the scale apparatus 1 in the direction parallel to the longitudinal direction of the scale 12. It should be noted that FIG. 6 shows one end of the main body 2 having the frame mounting holes 22 and 24. Hereinafter, explanation will be given on this portion. However, the other end of the main body 2 has the identical configuration as this portion.

Inside the frame 11 of the scale apparatus, a first washer 55 is arranged in such manner that a bolt insert hole of the first washer 55 has its center matched with the center of the frame mounting hole 24. Moreover, between the frame 11 and the reference block 4, a second washer 56 is arranged in such manner that a bolt insert hole of the second washer 56 has its center matched with the center of the frame mounting hole 24. The main body bolt 52 has its bolt head 61 contained in the frame 11 of the main body 2 and a bolt shaft portion 62 inserted through the insert hole of the first washer 55 and the insert hole of the second washer 56 to protrude out of the frame 11. A tightening force is applied to the main body bolt 52 in the direction from the bolt head 61 to the bolt shaft portion 62 (in the direction of $Z_1$ in the figure) so as to fix the frame 11 of the main body 2 to the reference block 4.

Here, the abutment surface of the first washer 55 in abutment with the frame 11 has a curvature parallel to the longitudinal direction of the scale 12 and does not have a curvature in the direction vertically intersecting the longitudinal direction of the scale 12. That is, the cross section of the first washer 55 along a plane parallel to the longitudinal direction of the scale 12, the abutment surface with the frame 11 has an arc shape. Moreover, the cross section of the first washer 55 along a plane vertically intersecting the longitudinal direction of the scale 12 has a straight line shape.

Accordingly, in the scale apparatus 1, it is possible to reduce the bending moment $M_1$ applied to the frame 11 and the scale 12 in the longitudinal direction. Consequently, it is possible to fix the main body 2 to the reference block 4 maintaining the scale 12 parallel to the relative movement between the reference block 4 and the movable block 5 in the longitudinal direction without deforming the frame 11 and the scale 12 into a bow shape, for example.

Moreover, the abutment surface of the first washer with the frame 11 is a straight line having no curvature in the direction vertically intersecting the longitudinal direction of the scale 12. Accordingly, the bending moment $M_2$ applied to the frame and the scale 12 in the direction vertically intersecting the longitudinal direction is not reduced. However, in the scale apparatus 1, the scale 12 is arranged at a center of the frame 11 when viewed in the cross section. Consequently, the bending moment $M_2$ of the scale in the direction vertically intersecting the longitudinal direction only causes a rotary deformation of the frame 11 and the scale 12 around the center of the scale 12. This does not lower the position detection accuracy of the scale apparatus 1. Furthermore, at this straight line portion, it is possible to apply a sufficient tightening force from the bolt head 61 to the bolt shaft portion 62, enabling to fix the frame 11 to the reference block 4 with a sufficient force.

Moreover, the first washer 55 may also have a rotation preventing groove, hole, boss or the like so that the arrangement position of the first washer 55 will not be changed by the rotary force caused when the frame 11 is fixed to the reference block 4 with the main body bolt 52. Moreover, the first washer 55 may have a partially flat surface vertically intersecting the abutment surface with the frame 11, so that the flat surface is brought into abutment with a non-rotary member of the frame 11 or other component. This enables to maintain the abutment surface of the first washer 55 with the frame 11 as a surface curved in the direction parallel to the longitudinal direction of the scale 12.

The first washer 55 having the aforementioned configuration is preferably made from a hard material such as iron material. The curvature of the abutment surface differs according to the size of the main body bolt 52. For example, if the main body bolt 52 is M4 to M8, the curvature is preferably in the order of 20 to 60 mm. An appropriate length of the abutment surface in the longitudinal direction of the scale 12 differs depending on the size of the main body bolt 52 and the material of the frame 11. For example, if the main body bolt 52 is M5 and the frame 11 is made from an iron metal, the length is preferably 2 to 10 mm. Moreover, when the main body bolt 52 has a large size, the tightening force also becomes large and the frame 11 is fixed to the reference block 4 with a large fixing force. This enables to maintain the longitudinal direction of the scale 12 parallel to the relative movement between the reference block 4 and the movable block 5, which in turn enables to maintain the position accuracy by the first washer 55 fixing the main body 2 to the reference block 4.

As has thus far been described, in the scale apparatus 1 according to the embodiment of the present invention, the frame 11 is fixed to the reference block 4 in parallel to the longitudinal direction of the scale 12, using the first washer 55 having an abutment surface with the frame 11, curved only in the direction parallel to the longitudinal direction of the scale 12. Accordingly, there is no danger of deformation of the frame 11 and the scale 12 in the longitudinal direction of the scale 12. Consequently, in this scale apparatus 1, it is possible to obtain a high detection accuracy in detecting a relative position between the reference block 4 and the movable block 5. Moreover, in this scale apparatus 1, it is possible to constitute the main body 2 without using a material having a high strength and to easily mount the frame 11 and the reference block 4. This enables to reduce the apparatus size as well as the production cost.

Next, explanation will be given on a modified example of the scale apparatus 1 in which a different fixing member is used for fixing the main body 2 to the reference block 4.

FIG. 7 is a cross sectional view for explaining a modified example of the scale apparatus 1. FIG. 7A is a cross sectional view of the scale apparatus 1 along plane vertically intersecting the longitudinal direction of the scale 12. FIG. 7B is a cross sectional view of the scale apparatus 1 along plane parallel to the longitudinal direction of the scale 12.

As shown in FIG. 7, in the scale apparatus 1, the second washer 56 may be replaced by a third washer 71 having a similar configuration as the first washer 55, i.e., having such an abutment surface with the frame 11 that a curvature is provided in the direction parallel to the longitudinal direction of the scale 12 and no curvature is provided in the direction vertically intersecting the longitudinal direction of the scale 12. The cross section of this third washer 71 viewed about a direction parallel to the longitudinal direction of the scale 12 is such that the abutment surface with the frame 11 has an arc shape, where as the cross section about a direction vertically intersecting the longitudinal direction of the scale 12 is such that the abutment surface with the frame 11 is a straight line.

In the scale apparatus 1 using this third washer 71, it is possible to further reduce the bending moment M1 applied in the longitudinal direction of the frame 11 and the scale 12. Consequently, there is no danger of deforming the frame 11 and the scale 12 into a bow shape, for example. It is possible to fix the main body 2 to the reference block 4 while maintaining the longitudinal direction of the scale 12 parallel to the relative movement between the reference block 4 and the movable block 5.

Moreover, similar to the first washer 55, the third washer 71 can also have a rotation preventing groove, hole, boss, or the like so that the arrangement position of the third washer 71 will not be changed by the rotary force generated when fixing the frame 11 to the reference block 4 with the main body bolt 52. Moreover, the third washer 71 may have a partially flat surface as a surface vertically intersecting the abutment surface with the frame 11, so that the partially flat surface is brought into abutment with a non-rotary member such as the reference block 4. This enables the third washer 71 to have the abutment surface with the frame 11 in such a manner that the curvature is provided in a direction parallel to the longitudinal direction of the scale 12.

FIG. 8 and FIG. 9 are cross sectional views showing the modifications of the fixing member of the scale apparatus 1. FIG. 8A and FIG. 9A are cross sectional views of the scale apparatus 1 in the direction intersecting the longitudinal direction of the scale 12, whereas FIG. 8B and FIG. 9B are cross sectional views of the scale apparatus 1 in the direction parallel to the longitudinal direction of the scale 12.

As shown in FIG. 8 and FIG. 9, in the scale apparatus 1, the first washer 55 may be replaced by a fourth washer 72. The fourth washer 72 has the abutment surface with the frame 11 and other-side, having a curvature in the direction parallel to the longitudinal direction of the scale 12 and no curvature in the direction vertically intersecting the longitudinal direction of the scale 12.

The fourth washer 72 has a bolt insert hole and two surfaces vertically intersecting the insert hole, serving as mounting surfaces 73, 74. The mounting surfaces 73, 74 have a curvature in the direction parallel to the longitudinal direction of the scale 12 and no curvature in the direction vertically intersecting the longitudinal direction of the scale 12. The fourth washer 72 is surrounded by a wall to define a concave 75, 76 having an approximately identical diameter as the outer diameter of the bolt head 61 of the main body bolt 52.

Thus, the fourth washer 72 has a symmetric configuration in the mounting direction of the main body bolt 52, so that the main body bolt 52 can be inserted from any of the sides to fix the frame 11 to the reference block 4. Accordingly, in this fourth washer 72, for example, as shown in FIG. 9, the mounting direction need not be reversed when using the side surface 17 of the frame 11 as the reference block 4, i.e., when performing a back mounting. Consequently, even when performing such a back mounting, this fourth washer 72 enables to reduce the load on a worker without requiring inversion of the mounting direction which may cause a significant accuracy deterioration.

As has been explained in the modified examples, in the scale apparatus 1 according to the embodiment of the present invention, the fixing member for fixing the frame 11 to the reference block 4 may be any fixing member if it has the abutment surface with the frame 11, as a surface curved only in the direction parallel to the longitudinal direction of the scale 12.

While the present invention has been described with respect to the scale apparatus 1 using as a recording medium the round bar-shaped scale 12 where a position signal is magnetically recorded, the present invention is not to be limited to such a type but may also be applied to a magnetic or optical scale apparatus using a recording medium of a thin plate prolonged shape having a thickness of 1 mm or below for example, or a magnetic or optical scale apparatus using a recording medium of a prolonged shape having a cross section of an approximately plate shape with a thickness of 3 to 7 mm.

Furthermore, the embodiment of the present invention has been described as the scale apparatus 1 in which the scale 12 serving as the recording medium having a position signal recorded is held by the brackets 13, 14 inside the frame 11. However, the present invention is not to be limited to such a type and may also be applied to a scale apparatus having a configuration in which for example, the recording medium is directly fixed to the reference block 4 without using the frame 11.

More specifically, in such a scale apparatus, a thin-plate prolonged recording medium having a position signal recorded in the longitudinal direction is fixed to a reference block 4 in such a manner that the longitudinal direction is in parallel to the relative movement of the reference block 4 and the movable block 5. In such a scale apparatus, the recording medium is fixed to the reference block 4 using the first washer 55 and the second washer 56 having an abutment surface with the recording medium, in a curvature only in the direction parallel to the longitudinal direction of the recording medium. The detection head is fixed to the movable block 5 so as to face the surface having the position signal in the recording medium. Thus, the scale apparatus can detect the relative movement position of the reference block 4 and the movable block 5.

That is, the present invention may also be applied to a scale apparatus in which the recording medium is fixed directly to the reference block 4 without causing deformation of the recording medium in the longitudinal direction. This enables to enhance the detection accuracy of the relative position of the reference block 4 and the movable block 5.

The position detection apparatus according to the present invention employs a fixing member having an abutment surface with the main body, the abutment surface having a curvature only in the direction parallel to the longitudinal direction of a recording medium. This fixing member fixes the main body to a first member so as to be parallel to the longitudinal direction of the recording medium, enabling to detect a relative movement position of the first member and a second member.

Thus, in the position detection apparatus according to the present invention, it is possible to fix the main body to the first member without causing deformation of the main body or the recording medium in the longitudinal direction of the recording medium. This enables to enhance the detection accuracy of the relative position between the first member and the second member. Moreover, in this position detection apparatus, it is possible to constitute the main body without using a material having a high strength as well as to easily mount the main body and the first member. Thus, it is possible to reduce the apparatus size as well as the production cost.

Moreover, in the position detection apparatus according to the present invention, the fixing member has an abutment surface with a recording medium, having a curvature only in a direction parallel to the longitudinal direction of the recording medium. This fixing member fixes the recording medium to the first member, so that the detection head detects the position signal recorded on the recording medium, so as to detect a relative movement position between the first member and the second member.

Thus, in the position detection apparatus according to the present invention, it is possible to fix the recording medium to the first member without causing deformation of the recording medium in the longitudinal direction. Accordingly, this position detection apparatus can have a high detection accuracy in detecting the relative position between the first member and the second member. Moreover, in this position detection apparatus, the recording medium can be constituted without using a material having a high strength. Moreover, the recording medium and the first member can easily be mounted. This enables to reduce the apparatus size and the production cost.

What is claimed is:

1. A position detection apparatus for detecting a relative movement position of a first member and a second member which move along a straight line relative to each other, said apparatus comprising:

a main body fixed to said first member and holding a prolonged recording medium having a position signal recorded in its longitudinal direction which is parallel to a relative movement direction of said first member and said second member;

a head slider fixed to said second member, having a detection head for detecting said position signal, and arranged on said main body so as to be movable in a direction parallel to the longitudinal direction of said recording medium; and a fixing member for fixing said main body to said first member and having an abutment surface for abutment with said main body, which abutment surface has a curvature only in a direction parallel to the longitudinal direction of said recording medium.

2. A position detection apparatus for detecting a relative movement position of a first member and a second member which move along a straight line relative to each other, said apparatus comprising:

a prolonged recording medium having a position signal recorded in its longitudinal direction and fixed to said first member in such a manner that the longitudinal direction is parallel to a relative movement direction of said first member and said second member;

a detection head fixed to said second member so as to move in a direction parallel to the longitudinal direction of said recording medium relative to said first member for detecting said position signal; and a fixing member for fixing said recording medium to said first member and having an abutment surface for abutment with said recording medium which abutment surface has a curvature only in a direction parallel to the longitudinal direction of said recording medium.

* * * * *